US012767244B2

(12) United States Patent
Antonelli et al.

(10) Patent No.: US 12,767,244 B2
(45) Date of Patent: Oct. 20, 2026

(54) ADJUSTABLE INTEGRATED FRONT AIRFOIL SYSTEM FOR A VEHICLE

(71) Applicant: FCA US LLC, Auburn Hills, MI (US)

(72) Inventors: Santiago Antonelli, Troy, MI (US); Arturo Guzman-Magana, LaSalle (CA); John C Shepherd, Troy, MI (US); Gregory F Fadler, Commerce Township, MI (US); Scott M Krugger, West Bloomfield, MI (US); Brian H Nielander, Royal Oak, MI (US); Christopher Piscitelli, West Bloomfield, MI (US); Deyan N Ninov, Royal Oak, MI (US)

(73) Assignee: FCA US LLC, Auburn Hills, MI (US)

(*) Notice: Subject to any disclaimer, the term of this patent is extended or adjusted under 35 U.S.C. 154(b) by 361 days.

(21) Appl. No.: 18/495,950

(22) Filed: Oct. 27, 2023

(65) Prior Publication Data

US 2024/0149955 A1 May 9, 2024

Related U.S. Application Data

(60) Provisional application No. 63/423,273, filed on Nov. 7, 2022.

(51) Int. Cl.
*B62D 35/00* (2006.01)
*B62D 25/10* (2006.01)

(52) U.S. Cl.
CPC ......... *B62D 35/005* (2013.01); *B62D 25/105* (2013.01)

(58) Field of Classification Search
CPC ............................ B62D 35/005; B62D 25/105
See application file for complete search history.

(56) References Cited

U.S. PATENT DOCUMENTS

| | | | | |
|---|---|---|---|---|
| 8,210,600 | B1 * | 7/2012 | Verhee | B62D 35/005 296/180.1 |
| 9,469,354 | B1 * | 10/2016 | Ciccone | G05D 3/00 |
| 9,714,058 | B2 * | 7/2017 | Fahland | B62D 35/005 |
| 11,299,218 | B2 * | 4/2022 | Gaylard | B62D 25/105 |
| 2018/0162458 | A1 * | 6/2018 | McMillan | B62D 35/008 |
| 2026/0103247 | A1 * | 4/2026 | Sedda | B62D 35/005 |

FOREIGN PATENT DOCUMENTS

| | | | | |
|---|---|---|---|---|
| DE | 102024003746 | B3 * | 11/2025 | B62D 35/005 |
| GB | 2555823 | B | 5/2020 | |
| JP | 7745395 | B2 * | 9/2025 | B60R 19/02 |

* cited by examiner

*Primary Examiner* — Faye M Fleming
(74) *Attorney, Agent, or Firm* — Jeremy J. Klobucar

(57) ABSTRACT

A vehicle includes a front fascia, a hood, and a front airfoil system including a front wing extending across a front of the vehicle. The front wing is spaced above and apart from the front fascia and the hood to define an upper airflow opening between the front fascia and the front wing. While the vehicle is moving, the upper airflow opening is configured to receive a flow of air therethrough and over the hood to enhance aerodynamic performance of the vehicle.

19 Claims, 6 Drawing Sheets

ADJUSTABLE INTEGRATED FRONT AIRFOIL SYSTEM FOR A VEHICLE

CROSS-REFERENCE TO RELATED APPLICATION

This application claims the benefit of U.S. Provisional Pat. App. No. 63/423,273, filed Nov. 7, 2022, the contents of which are incorporated herein by reference thereto.

FIELD

The present application relates generally to vehicle aerodynamic systems and, more particularly, to an adjustable front airfoil system for a vehicle.

BACKGROUND

Some vehicles, such as muscle cars, are designed with aggressive front ends for styling and aesthetics. However, some aggressive front end designs may potentially affect aerodynamic performance of the vehicle. Thus, while such systems do work well for their intended purpose, it is desirable to provide continuous improvement in the relevant art to provide greater utility.

SUMMARY

In accordance with one example aspect of the invention, a vehicle is provided. In one example implementation, the vehicle includes a front fascia, a hood, and a front airfoil system including a front wing extending across a front of the vehicle. The front wing is spaced above and apart from the front fascia and the hood to define an upper airflow opening between the front fascia and the front wing. While the vehicle is moving, the upper airflow opening is configured to receive a flow of air therethrough and over the hood to enhance aerodynamic performance of the vehicle.

In addition to the foregoing, the described vehicle may include one or more of the following features: wherein the front fascia further includes first and second opposed outboard supports extending upwardly from a front bumper, and wherein the upper airflow opening is defined between the first and second opposed outboard supports, the front fascia, and the front wing; wherein the front wing includes a first end supported by the first outboard support and a second end supported by the second outboard support; wherein the front fascia further includes a central stanchion extending upwardly from the front bumper, the central stanchion disposed centrally within the upper airflow opening; and wherein the front wing is coupled to and supported by the central stanchion.

In addition to the foregoing, the described vehicle may include one or more of the following features: wherein the front wing has an airfoil shaped cross-section; wherein the hood includes an inner section disposed between a pair of outboard sections; wherein the hood inner section slopes forward and downward flush with an upper surface of the front bumper, and wherein the hood outboard sections align flush with an upper surface of outboard ends of the front wing; and wherein the front wing is disposed forward of a leading edge of the hood.

In addition to the foregoing, the described vehicle may include one or more of the following features: wherein the front airfoil system further includes an actuator configured to rotate a portion of the front wing upward or downward to adjust an angle thereof; wherein the portion is the entire front wing; wherein the portion is a central section of the front wing; wherein the portion is a first section and a second section; wherein the first and second sections are independently rotatable relative to each other; wherein the portion rotates about a pivot point located at a forward edge of the front wing; wherein the portion rotates about a pivot point located at a rear edge of the front wing; and wherein the portion rotates about a pivot point located at a central location of the front wing.

In addition to the foregoing, the described vehicle may include one or more of the following features: a controller in signal communication with the actuator, the controller configured to operate the actuator to adjust the angle of the portion of at least the portion of the front wing; wherein the controller is configured to automatically adjust the angle of the front wing based on a selected driving mode of the vehicle; and wherein the controller is in signal communication with an in-vehicle user interface configured to allow a user to manually adjust the angle of the front wing.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
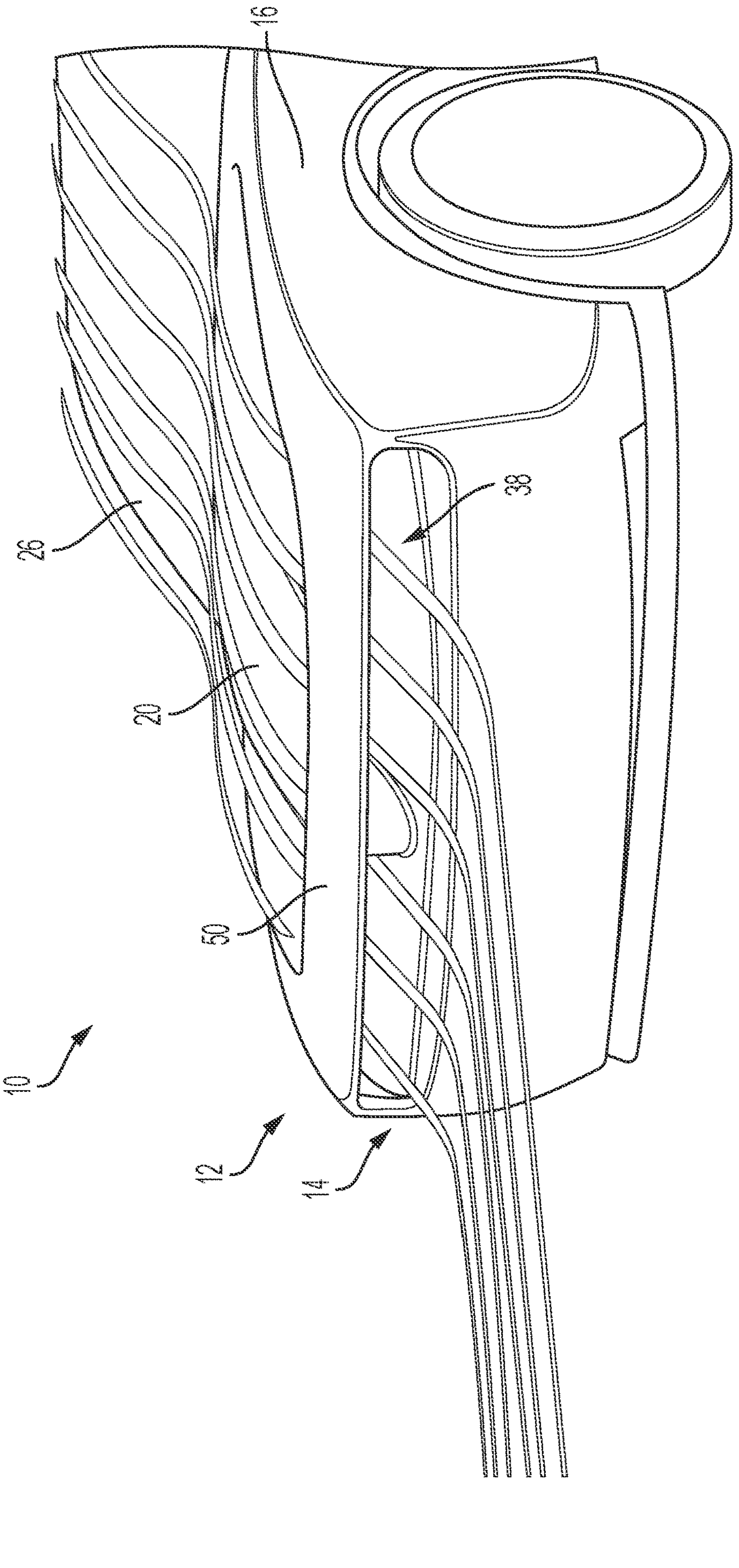
FIG. 1 is a front perspective view of a vehicle with an example front airfoil system in accordance with the principles of the present application.

Described herein is a vehicle with front airfoil system having a single airfoil element with a variable angle of attack that mounts to the front fascia of the vehicle. The airfoil element in its normal orientation is configured to provide drag and front lift reduction. The airfoil element forms a single wing extending across a front of the vehicle that is supported at its ends and centrally by a stanchion. One or more actuators are packaged in the vehicle (e.g., in the outboard front fascia and/or center stanchion) and configured to actuate the wing to adjust the angle of attack (e.g., the angle between the chord of the wing and the airflow). The front airfoil system is part of the class-A surface and is thus integrated into the vehicle to work in unison with the vehicle suspension to adjust vehicle dynamics.

In one example, the front airfoil system actuates an airfoil section to thereby change lift and drag to suit different driving conditions and aid in braking (e.g., a high drag position). For example, the airfoil section may be adjusted to a single angle of attack or a dual angle of attack. In one example, a single angle of attack involves the entire airfoil rotating as one section, while a dual angle of attack involves the airfoil movement split between a left and right section, which may have independent angles of attack. A dual angle of attack may aid in certain driving maneuvers such as turning at high speeds. Additionally, the airfoil section may be actuated to adjust wing height and/or wing length. For example, the height may be increased to rotate the airfoil angle of attack further negative than geometry allows at nominal height (e.g., making the front wing perpendicular to the flow).

The front airfoil system advantageously allows for an aggressive front end design that minimizes negative aerodynamics that can potentially be associated with aggressive front end designs. In one example, the front airfoil system is integrated into the front fascia and forms, at a forward end thereof, a relatively squared off design from a side view resulting in the aggressive front end design. However, the front airfoil system is also configured to advantageously guide airflow under the front wing thereof so as to flow along a hood line of the vehicle. In one example, the hood and/or hood line of the vehicle slopes forward and downward flush or seamlessly under the front wing to and forming a forward edge of the front airfoil system and of the front fascia. In one example, an inner section of the hood slopes forward and downward as described above, while outer sections of the hood flanking the inner section do not and seamlessly align (e.g., in a flush manner) with upper/outer surfaces of the front wing.

One mechanism through which the drag reduction occurs is to allow the airflow to pass around the highly optimized front wing, shaped in such a way as to allow the styling to retain the desired aggressive look. The wing geometry and actuation allows for additional aerodynamic performances to be enhanced such as lift and vehicle balance. For example, drag and front lift may be reduced as a result of the vehicle no longer having a recessed upper front grille. Such grilles can potentially cause drag and lift due to their location, typically near the stagnation point, where high pressure builds on the upper portion of the recessed upper front grilles. When grille geometry is no longer present and replaced by the highly optimized front wing, the flow goes under the wing rather than becoming entrapped in the recessed upper front grille and drag and front lift are reduced as a result.

Figure 2:
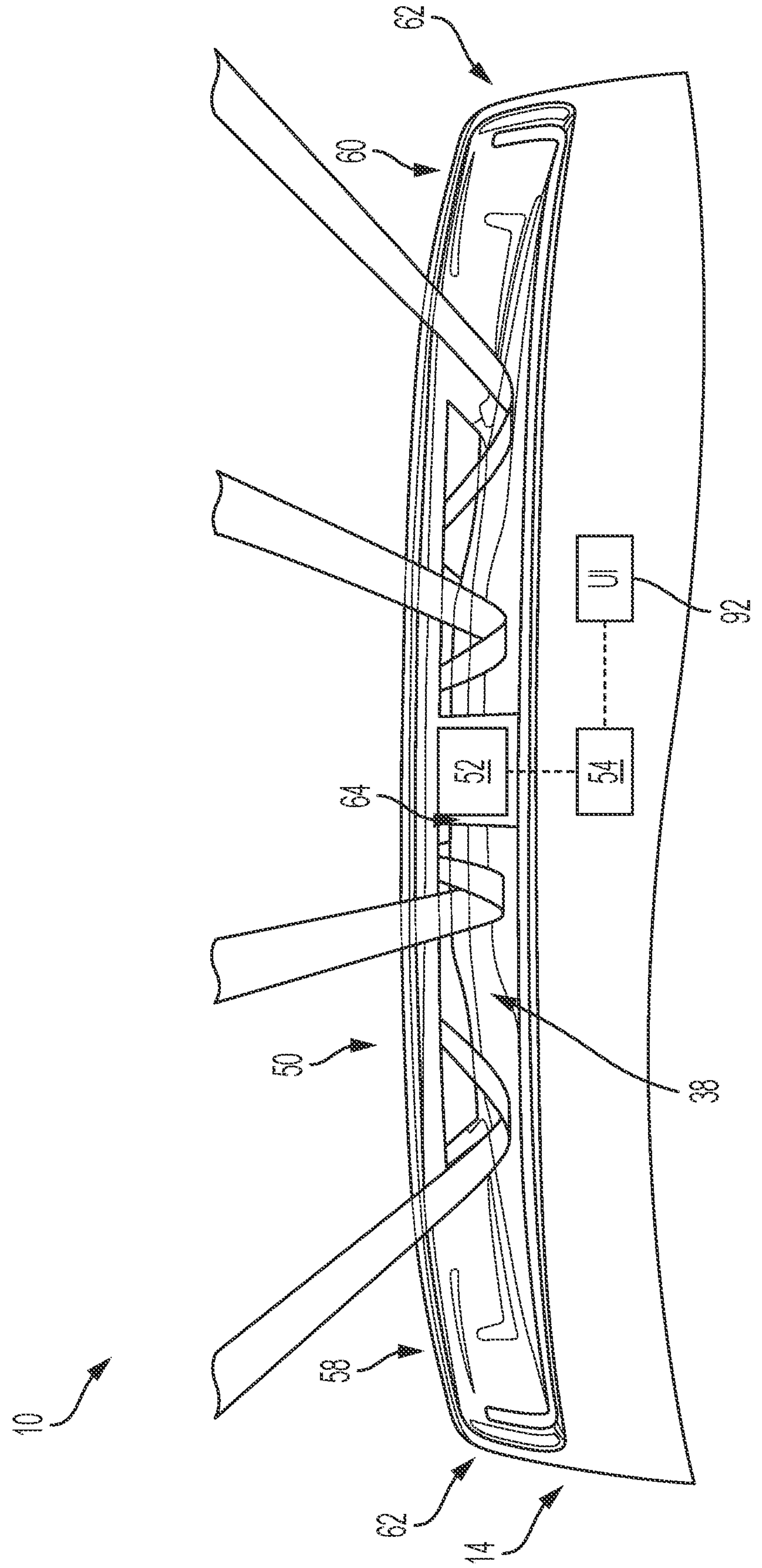
FIG. 2 is a front view of the front airfoil system of FIG. 1, in accordance with the principles of the present application.
Figure 3:
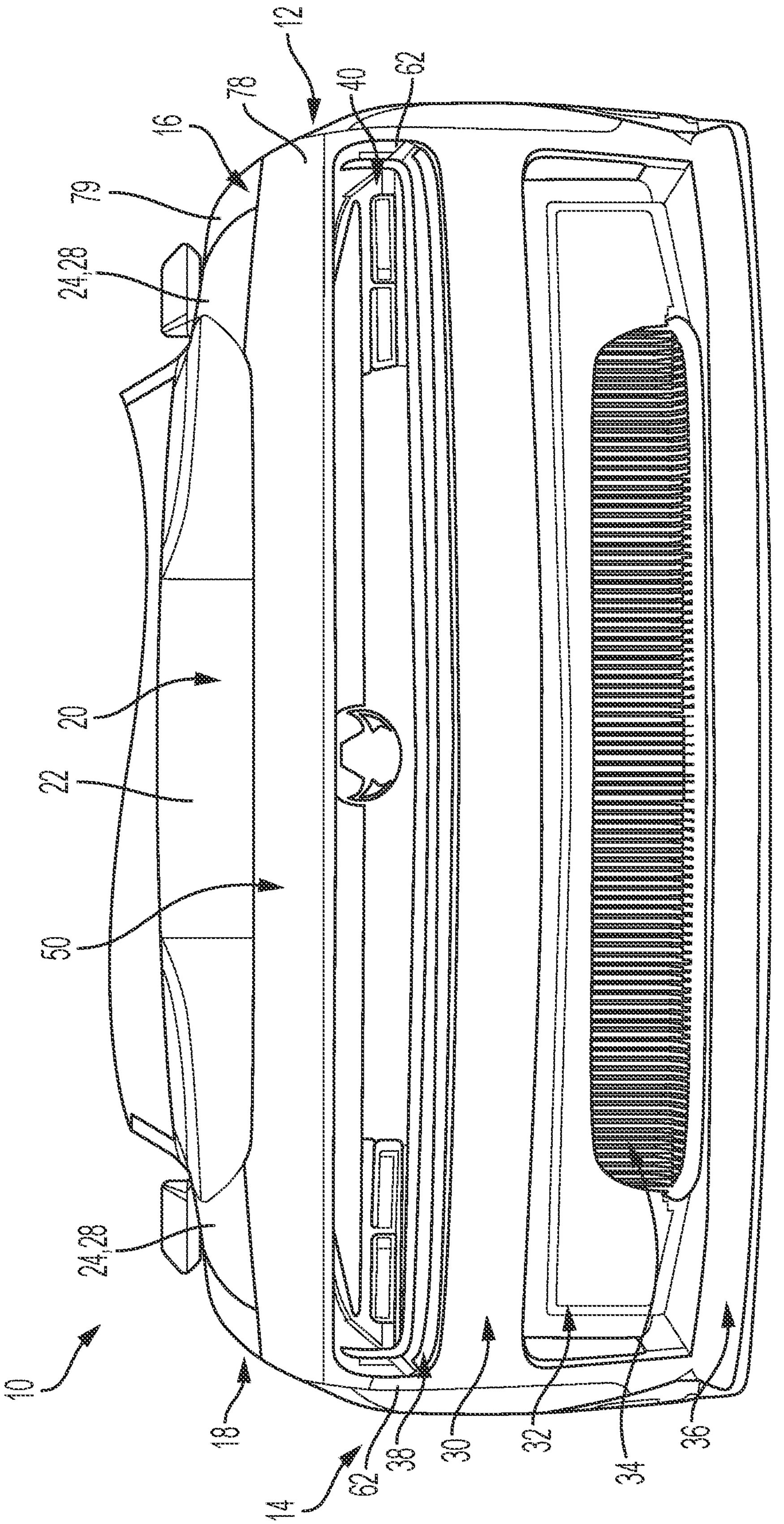
FIG. 3 is a front view of the vehicle of FIG. 1, in accordance with the principles of the present application.
Figure 4:
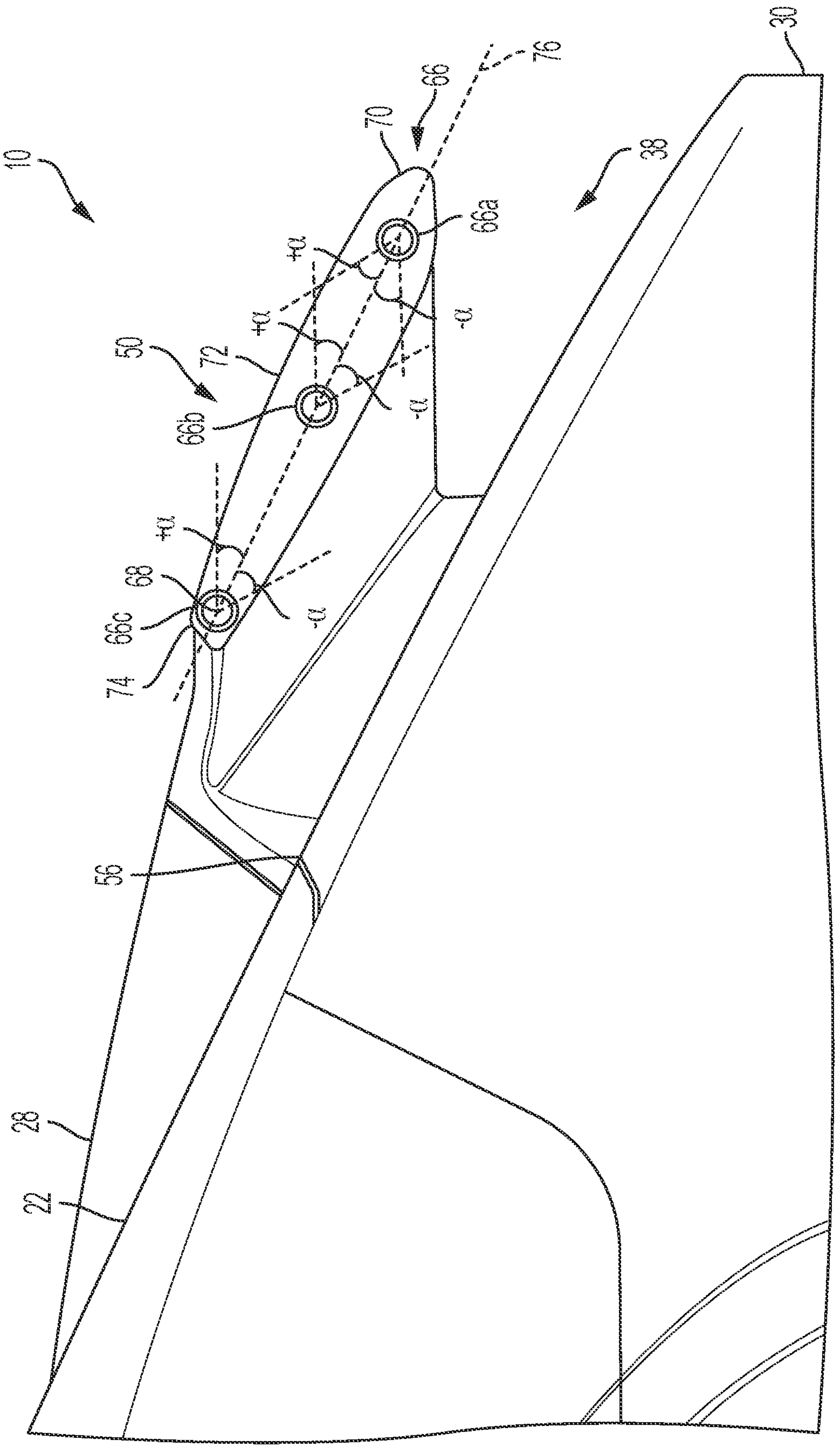
FIG. 4 is a side sectional view of the front airfoil system of FIG. 1, in accordance with the principles of the present application.
Figure 5:
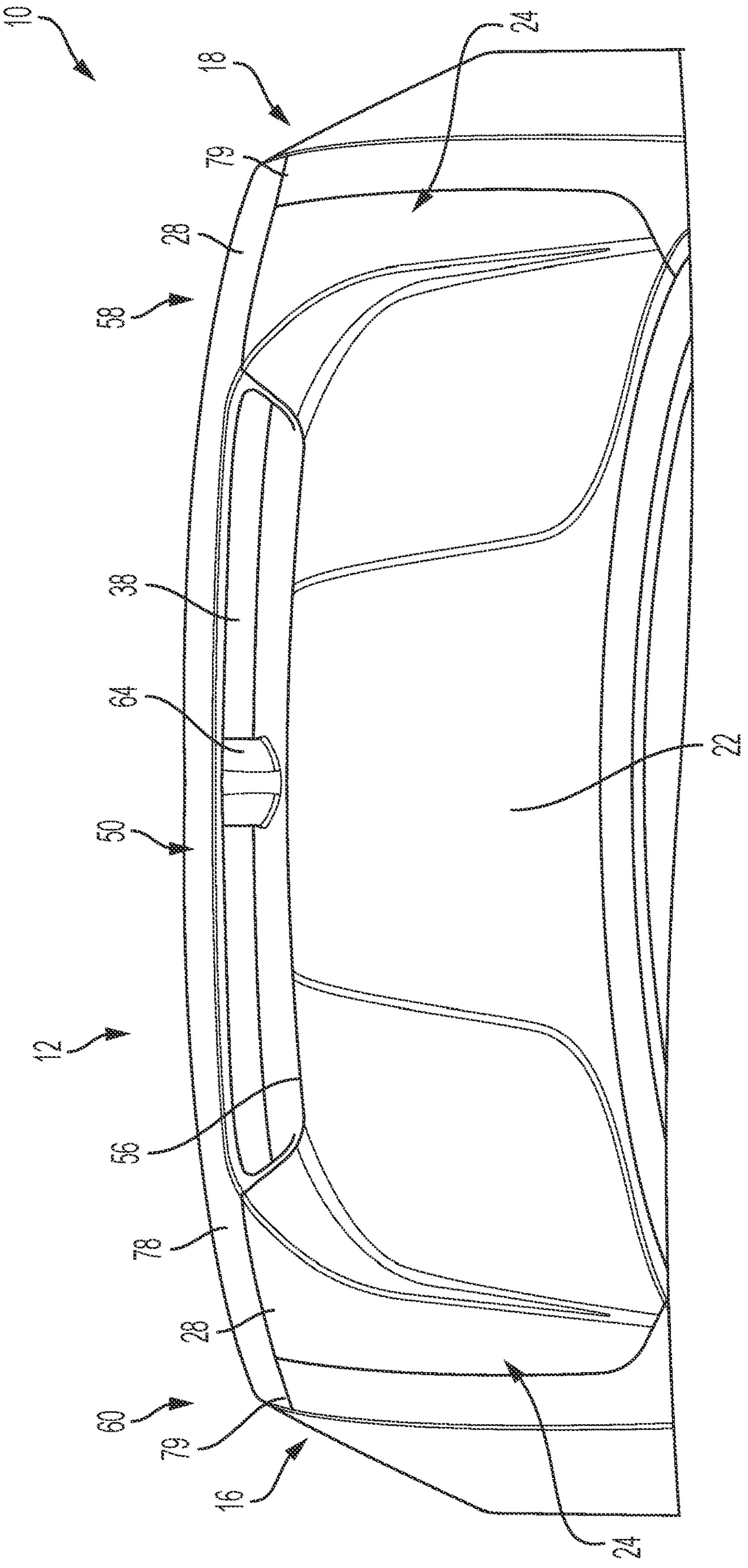
FIG. 5 is a top view of the front airfoil system of FIG. 1, in accordance with the principles of the present application.

With reference now to FIGS. 1-5, a vehicle 10 with a front airfoil system 12 is illustrated. The vehicle 10 generally includes a front fascia 14, a front left side panel 16, a front right side panel 18, and a hood 20. As shown in FIGS. 3 and 5, the hood 20 includes a central or inner section 22 disposed between outboard sections 24. The hood inner section 22 slopes forward and downward as it extends from a windshield 26 to the front fascia 14 and front airfoil system 12. The outboard sections 24 extend forward and widen as they extend from the windshield 26 to the front airfoil system 12. While outboard hood sections 24 slope slightly downward, the slope is not as pronounced as on the hood inner section 22. Further, as shown, an upper surface 28 of each outboard hood section 24 is flush or contiguous with an upper surface of the side panels 16, 18 and the front airfoil system 12.

In the example embodiment, the front fascia 14 defines a front bumper 30, a lower grille recess 32 to receive a grille 34, a front chin or lower spoiler 36, and an upper airflow opening 38 located above the front bumper 30. One or more headlights 40 may be disposed in the front fascia 14. In one example, the headlights 40 are disposed in the upper airflow opening 38 defined by the front airfoil system 12 and at least in part by a front wing thereof.

The front airfoil system 12 generally includes a front spoiler or airfoil or wing 50, an actuator 52, and a controller 54. As shown in FIG. 4, the front wing 50 has an airfoil shaped cross-section and extends generally cross-car at a position forward of a leading edge 56 of the hood 20. As shown in FIG. 3, the front wing 50 includes a first end 58 and an opposite second end 60 each supported by opposed upper outboard supports 62 of the front fascia 14. The front wing 50 is also coupled to and centrally supported by a central stanchion 64. In this way, the front wing 50 is integrated into the design and contour of the front of vehicle 10.

In the example embodiment, the front wing 50 and front fascia 14 cooperate to define the upper airflow opening 38, which is configured to receive a flow of air when driving, as shown in FIGS. 1 and 2. The airfoil shape of front wing 50 is configured to direct a portion of airflow through the upper airflow opening 38. The front wing 50 is more beneficial from a drag and lift standpoint than removing the front wing and raising the hood leading edge. Lift performance can be modified when the wing 50 is actuated (e.g., rotated) to various positions. For example, the front wing 50 may be actuated to a positive angle of attack from nominal for increased front lift, or a negative angle of attack from nominal for increased front downward force.

The controller 54 is in signal communication with the actuator 52 and is configured to operate the actuator 52 to vary a position of the front wing 50. For example, the actuator 52 can be configured to automatically rotate the front wing 50 (e.g., up/down) to vary the angle of attack (orientation) ‘a’ thereof, and thereby change the aerodynamic function of the front wing 50. In one example, the actuator 52 is a motor configured to rotate an actuator rod 66 about a pivot point 68 to adjust the angular orientation of the front wing 50. It will be appreciated however, that front wing 50 may have any suitable mechanism or linkage other than actuator rod 66 that enables rotatable front wing 50 to function as described herein.

As shown in FIG. 4, the actuator rod 66 can be disposed at various locations within the front wing 50 in a cross-car direction. For example, actuator rod **66*a* is disposed at a forward edge 70 of the front wing 50, actuator rod 66*b* is disposed in a central location 72 of the front wing 50, and actuator rod 66*c* is disposed at a rear edge 74 of the front wing 50. However, the illustrated locations are merely exemplary and it will be appreciated that actuator rod 66 may be located at any desired location within the front wing 50**.

As shown in FIGS. 3-5, in a default (non-rotated) position, front wing 50 extends along a longitudinal axis 76 (FIG. 4) such that an upper surface 78 of the entire front wing 50 is flush or contiguous with an upper surface 79 of the side panels 16, 18 and the upper surface 28 of the outboard hood sections 24 (see FIG. 5). The front wing 50 is adjustable relative to the longitudinal axis 76 such that the front wing 50 is movable anywhere between a minimum angle ‘-a’ and a maximum angle c-Fa'. In the example embodiment, the nominal orientation of the front wing 50 is set at an angle of attack that has the lowest drag penalty. Adjusting the front wing 50 towards the maximum angle is configured to increase lift on the front of the vehicle 10, while adjusting the front wing 50 towards the minimum angle is configured to increase downward force on the front of the vehicle 10.

Figure 7:
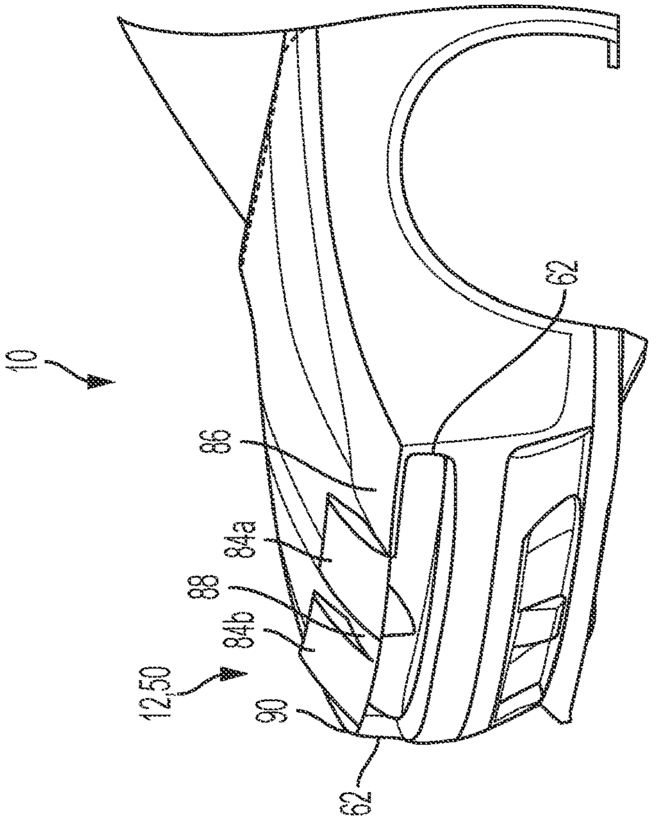
FIG. 7 is a perspective view of the vehicle of FIG. 1 with another example embodiment of the front airfoil system, in accordance with the principles of the present application.
Figure 6:
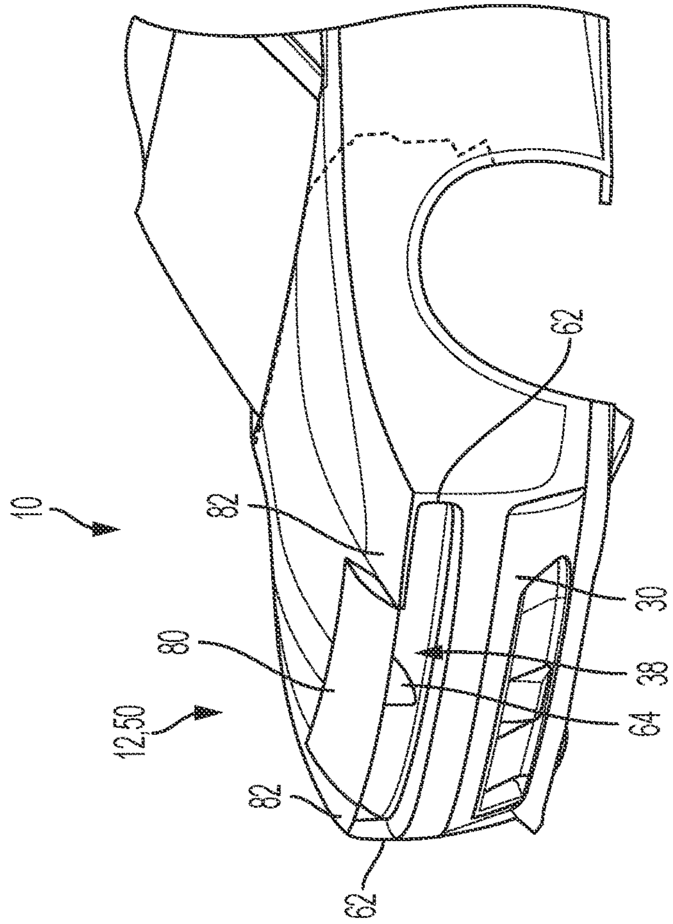
FIG. 6 is a perspective view of the vehicle of FIG. 1 with one example embodiment of the front airfoil system, in accordance with the principles of the present application.

With reference now to FIGS. 6 and 7, various embodiments of the front wing 50 will be described in more detail. As previously described, the front wing 50 is selectively rotatable to adjust an angular orientation thereof. However, various portions of the front wing 50 may be fixed from rotation while one or more other portions are rotatable. In some embodiments, the entire front wing 50 is rotatable. In another example embodiment shown in FIG. 6, the front wing 50 includes a central rotatable flap 80 disposed between a pair of fixed (non-rotatable) portions 82. The central rotatable flap 80 is located centrally over the central stanchion 64, and the fixed wing portions 82 are coupled to and supported by the upper outboard supports 62.

In another example embodiment, shown in FIG. 7, the front wing 50 includes a first or left rotatable flap or section 84*a* and a second or right rotatable section 84*b*. The left rotatable section 84*a* is disposed between an outboard fixed portion 86 and a central fixed portion 88, and the right rotatable section 84*b* is disposed between an outboard fixed portion 90 and the central fixed portion 88. The fixed wing portions 86, 90 are coupled to and supported by the upper outboard supports 62, and the central fixed portion 88 is coupled to and supported by the central stanchion 64. In the example embodiment, the left and right rotatable sections 84*a,b* are independently rotatable relative to each other to enable independent lift and balance adjustment of left and right sides of the vehicle, for example, when cornering or on a pitched surface.

As previously discussed, the front wing 50 (or portions thereof) is rotatable between a minimum angle and a maximum angle. In one example, the maximum angle +a' is 10 degrees and the minimum angle '−a' is −10 degrees. In one example for actuator rod 66*a*, maximum angle +a' is 30 degrees and the minimum angle '−a' is −10 degrees. In one example for actuator rod 66*b*, the maximum angle +a' is 20 degrees and the minimum angle '−a' is −20 degrees. In one example for actuator rod 66*c*, the maximum angle +a' is 30 degrees and the minimum angle '−a' is −10 degrees. Such angles may be approximate. Moreover, it will be appreciated that front wing 50 may be rotatable to any desirable angle that enables front airfoil system 12 to function as described herein.

In operation, the position of front wing 50 may be automatically adjusted based on various conditions of the vehicle such as, for example, a driving mode of the vehicle 10 (e.g., sport/race/comfort, etc.), a measured speed, or other vehicle or environmental condition (e.g., ambient temperature). In other examples, the position of front wing 50 is manually adjustable by a vehicle user. For example, the controller 54 may be in signal communication with an in-vehicle user interface 92 (FIG. 2), such as one or more buttons, switches, displays, etc. in the vehicle 10. The user interface 92 is configured to provide the user with options (e.g., soft buttons) to manually adjust the angle 'a' of the front wing 50. As such, the front airfoil system 12 provides a manually or automatically adjustable front wing 50 to provide variable drag and lift performance.

Described herein are systems and methods for a front airfoil system for a vehicle. The front airfoil system includes a front airfoil extending cross-vehicle forward of the vehicle hood. An upper airflow opening, defined between the front bumper and front airfoil, is configured to receive a flow of air to improve drag and lift. The angle of orientation of the front airfoil is selectively adjustable to provide variable drag and lift performance to advantageously adjust vehicle performance.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle comprising:

a front fascia;

a hood; and a front airfoil system including a front wing extending across a front of the vehicle, wherein the front wing is spaced above and apart from the front fascia and the hood to define an upper airflow opening between the front fascia and the front wing, and wherein while the vehicle is moving, the upper airflow opening is configured to receive a flow of air therethrough and over the hood to enhance aerodynamic performance of the vehicle, and wherein the front fascia further includes a central stanchion extending upwardly from a bumper, the central stanchion disposed centrally within the upper airflow opening.

2. The vehicle of claim 1, wherein the front fascia further includes first and second opposed outboard supports extending upwardly from the bumper, and wherein the upper airflow opening is defined between the first and second opposed outboard supports, the front fascia, and the front wing.

3. The vehicle of claim 2, wherein the front wing includes:

a first end supported by the first outboard support; and a second end supported by the second outboard support.

4. The vehicle of claim 1, wherein the front wing is coupled to and supported by the central stanchion.

5. The vehicle of claim 1, wherein the front wing has an airfoil shaped cross-section.

6. The vehicle of claim 2, wherein the hood includes an inner section disposed between a pair of outboard sections.

7. The vehicle of claim 6, wherein the hood inner section slopes forward and downward flush with an upper surface of the front bumper, and wherein the hood outboard sections align flush with an upper surface of outboard ends of the front wing.

8. The vehicle of claim 1, wherein the front wing is disposed forward of a leading edge of the hood.

9. A vehicle comprising:

a front fascia;

a hood; and a front airfoil system including a front wing extending across a front of the vehicle, wherein the front wing is spaced above and apart from the front fascia and the hood to define an upper airflow opening between the front fascia and the front wing, and wherein while the vehicle is moving, the upper airflow opening is configured to receive a flow of air therethrough and over the hood to enhance aerodynamic performance of the vehicle, wherein the front airfoil system further includes an actuator configured to rotate a portion of the front wing upward or downward to adjust an angle thereof.

10. The vehicle of claim 9, wherein the portion is the entire front wing.

11. The vehicle of claim 9, wherein the portion is a central section of the front wing.

12. The vehicle of claim 9, wherein the portion is a first section and a second section.

13. The vehicle of claim 12, wherein the first and second sections are independently rotatable relative to each other.

14. The vehicle of claim 9, wherein the portion rotates about a pivot point located at a forward edge of the front wing.

15. The vehicle of claim 9, wherein the portion rotates about a pivot point located at a rear edge of the front wing.

16. The vehicle of claim 9, wherein the portion rotates about a pivot point located at a central location of the front wing.

17. The vehicle of claim 9, further comprising a controller in signal communication with the actuator, the controller configured to operate the actuator to adjust the angle of the portion of at least the portion of the front wing.

18. The vehicle of claim 17, wherein the controller is configured to automatically adjust the angle of the front wing based on a selected driving mode of the vehicle.

19. The vehicle of claim 17, wherein the controller is in signal communication with an in-vehicle user interface configured to allow a user to manually adjust the angle of the front wing.

* * * * *